Figures 4, 5:
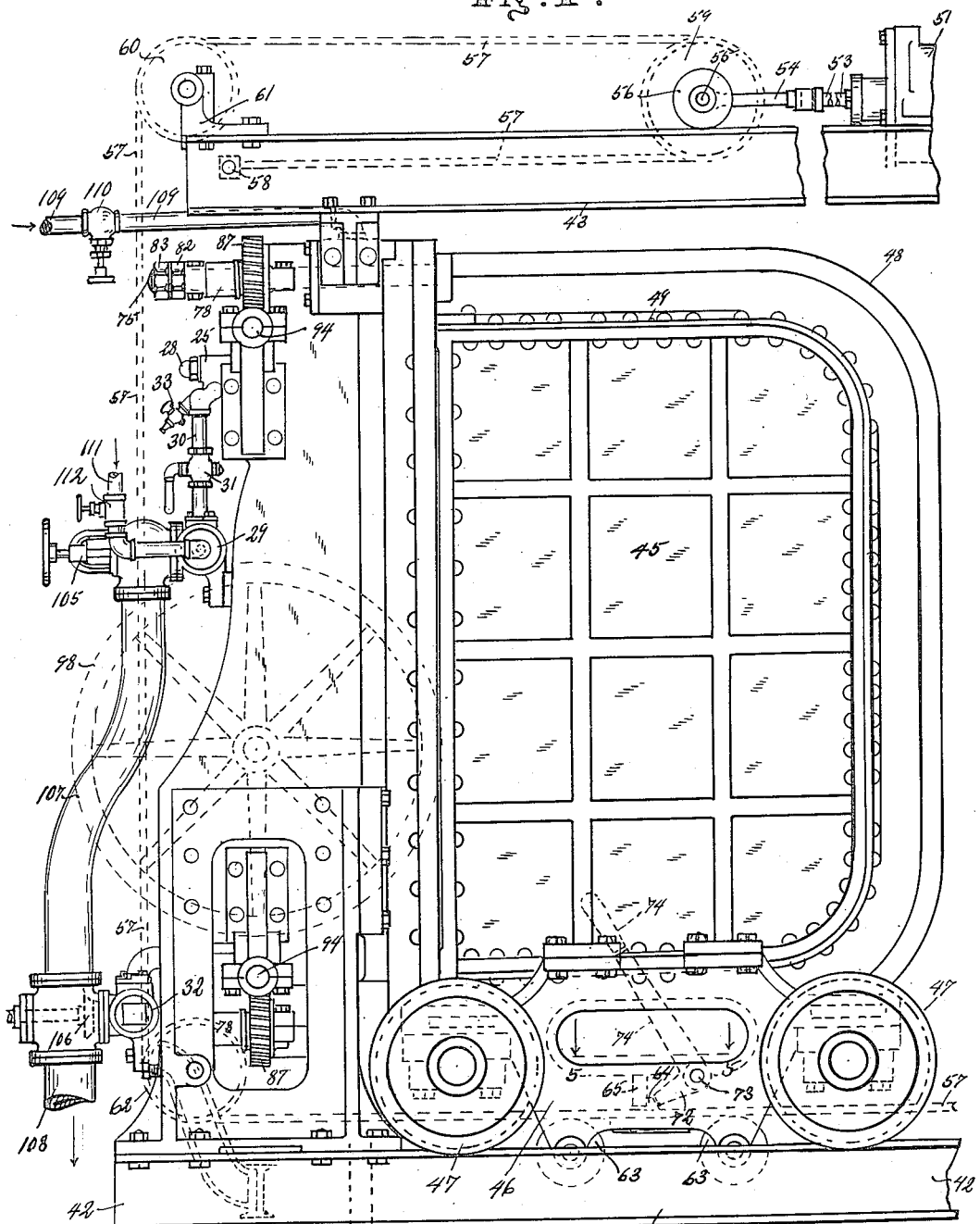

A. R. PECK.
FILTERING APPARATUS.
APPLICATION FILED AUG. 28, 1916.
1,282,280.
Patented Oct. 22, 1918.
4 SHEETS—SHEET 1.
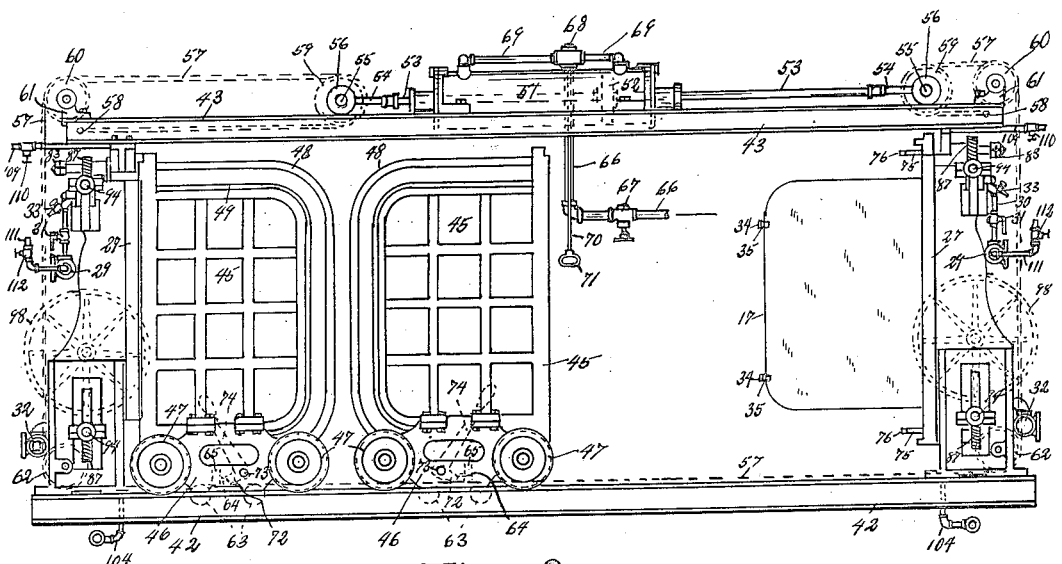
Fig. 1.
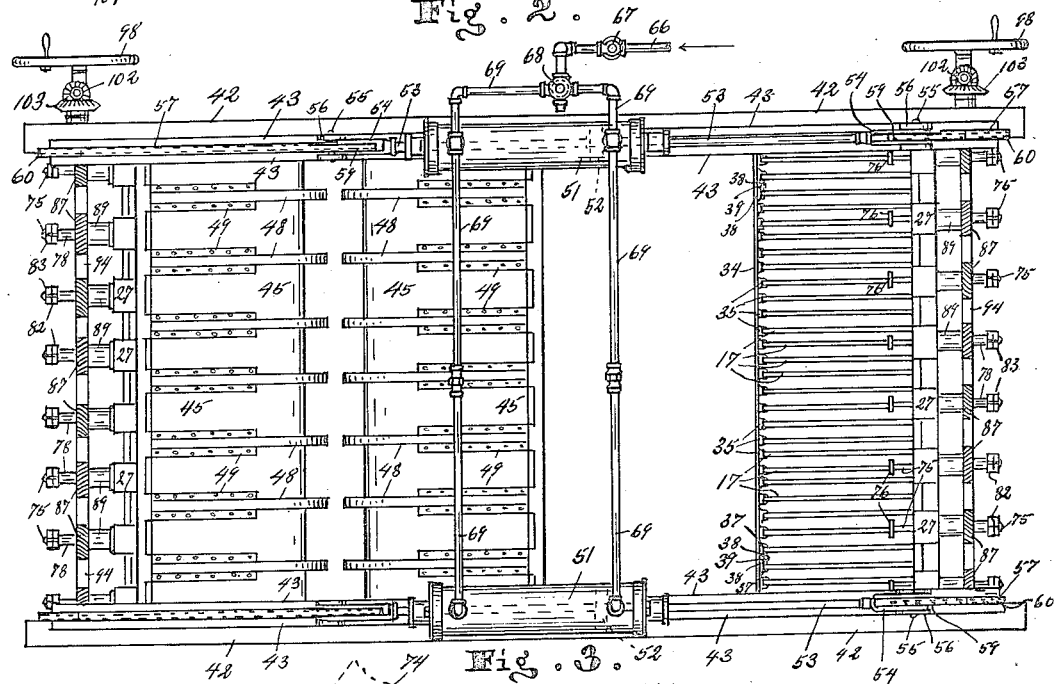
Fig. 2.
Fig. 3.
Witness:
W. M. Geatle,
Inventor.
Arthur R. Peck
By
Alex H. Lidders
Attorney.

A. R. PECK.
FILTERING APPARATUS.
APPLICATION FILED AUG. 28, 1916.

1,282,280.

Patented Oct. 22, 1918.
4 SHEETS—SHEET 2.

Witness:
W. M. Gentle.

Inventor,
Arthur R. Peck
By
Attorney.

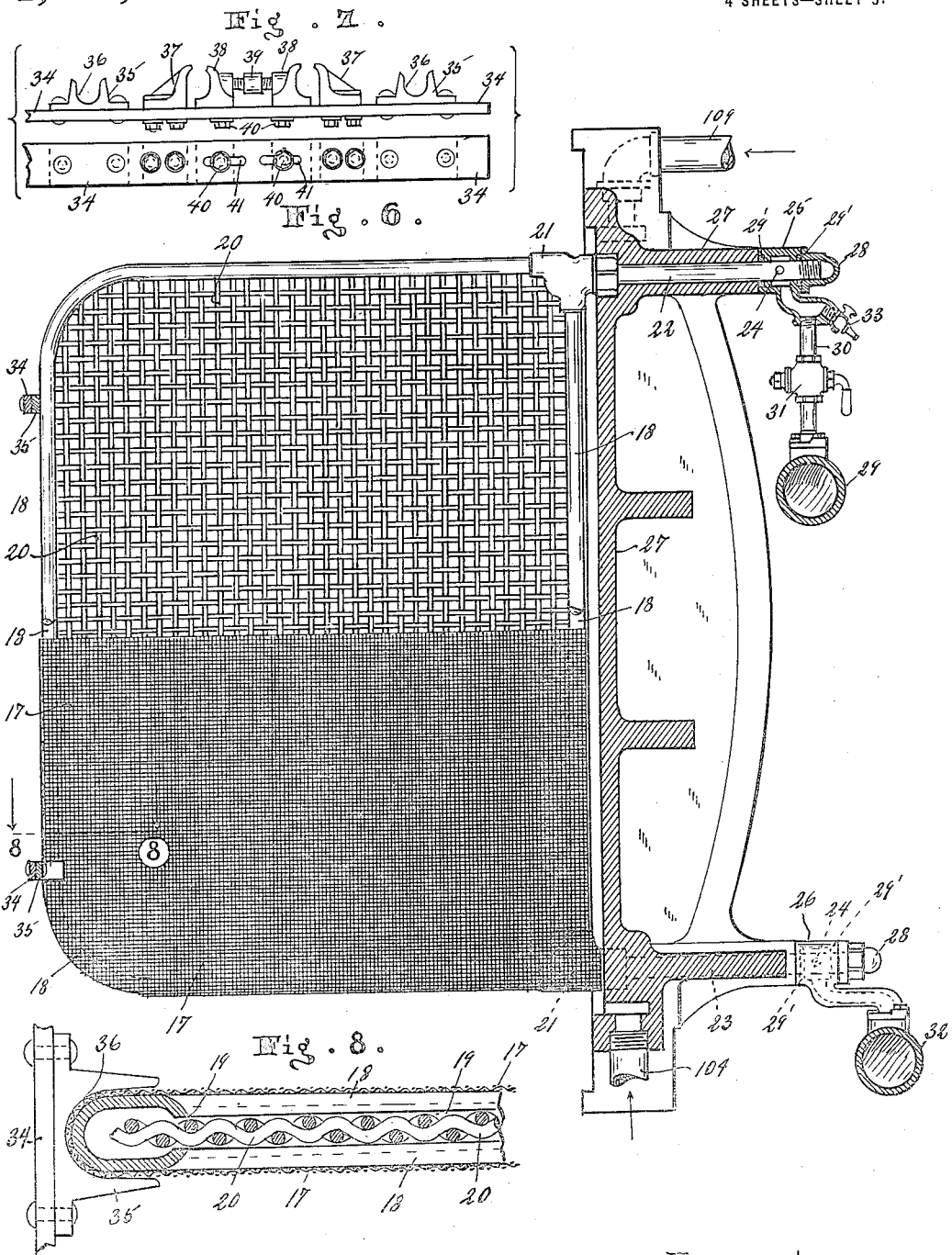

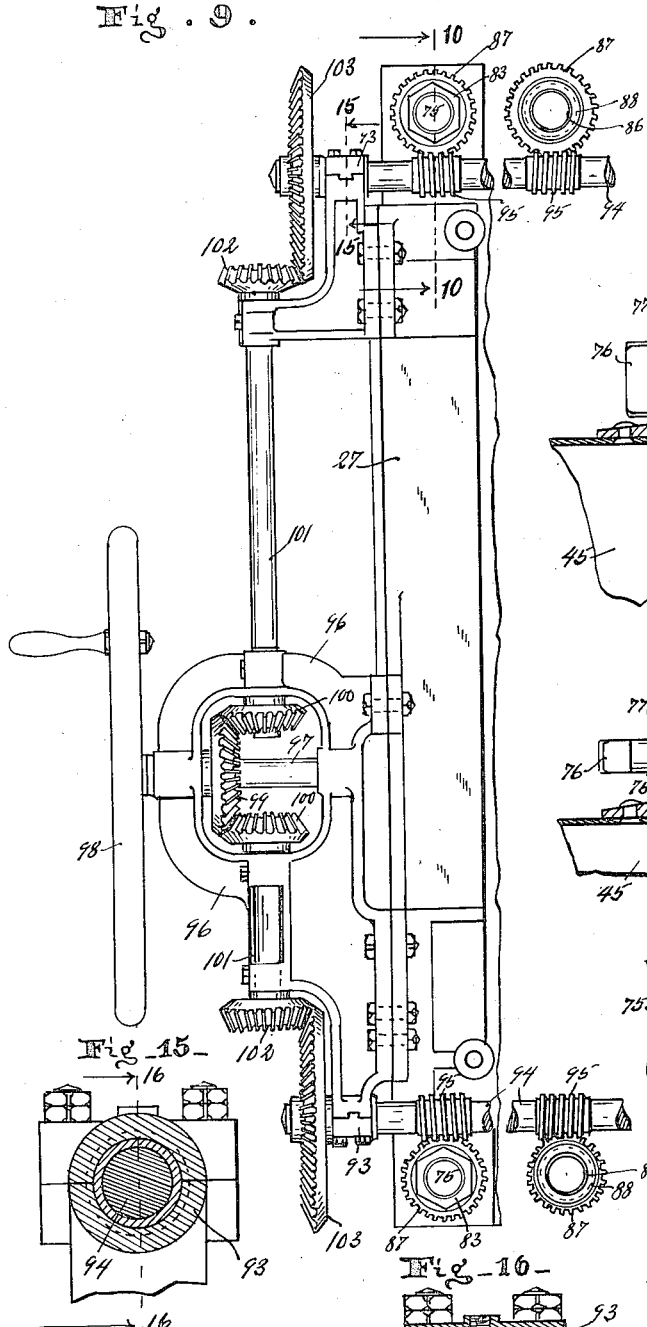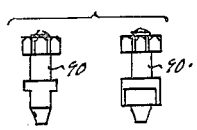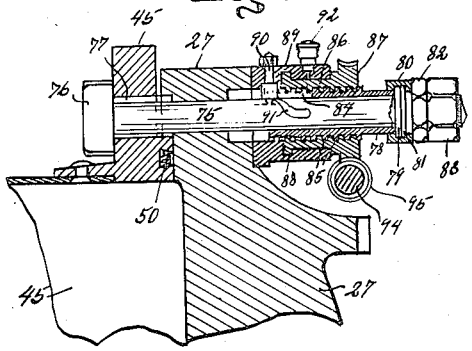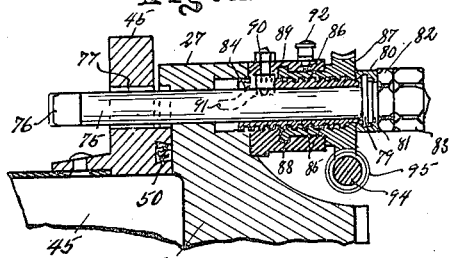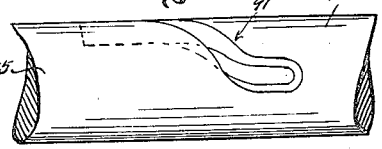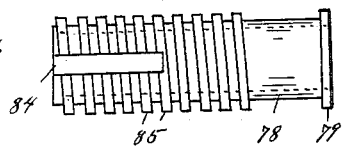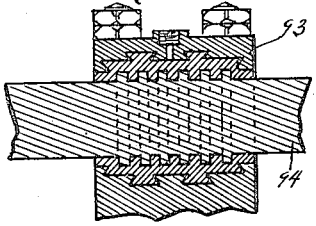

UNITED STATES PATENT OFFICE.

ARTHUR R. PECK, OF LOS ANGELES, CALIFORNIA.

FILTERING APPARATUS.

1,282,280.  Specification of Letters Patent.  Patented Oct. 22, 1918.

Application filed August 28, 1916. Serial No. 117,368.

*To all whom it may concern:*

Be it known that I, ARTHUR R. PECK, a citizen of the United States of America, residing at Los Angeles, county of Los Angeles, State of California, have invented a certain new and useful Filtering Apparatus; and I do hereby declare the following to be a full, clear, and exact description of the invention, such as will enable others skilled in the art to which it appertains to make and use the same.

This invention relates to filtering apparatus, and it may be said to consist in the provision of the novel and advantageous features, and in the novel and improved construction, arrangement, and combination of parts and devices as will be apparent from the description and claims which follow hereinafter.

One object of the invention is to provide filtering apparatus with filter leaves of a novel and improved construction.

Another object of this invention is to provide a novel and improved filtering apparatus having the filter leaves disposed on a stationary plate which covers the opening of a chamber which latter is movable from the stationary cover plate without disturbing the filter leaves, so that the deposit or cake on the filter leaves is not jarred or shaken off of the leaves and the latter can be conveniently gotten at to remove the deposit or to repair or renew them.

Another object of the invention is to provide a novel and improved filtering apparatus comprising two units with the stationary cover plates and movable chambers—arranged so that space is saved and one of the chambers can be moved from its cover plates and placed adjacent to the other chamber while the latter is locked to its cover plate.

Another object of the invention is to provide a novel and improved means for locking the movable chamber to the stationary cover plate.

A further object of the invention is to provide a novel and improved means for spacing the filter leaves and clamping them in spaced position on the cover plates.

Further objects of the invention are to provide a novel and improved filtering apparatus which is practical and serviceable, economical to install, maintain, and operate, convenient and efficient in use, and which occupies a comparatively small space and yet produces a comparatively large capacity result.

Other objects and the advantages of the invention will be apparent to those skilled in the art from a careful consideration of the following description of the preferred construction embodying the invention, taken in connection with the accompanying drawings in which—

Figure 1 is a side elevational view of the filtering apparatus; Fig. 2 is a plan view of the same; Fig. 3 is an enlarged broken and dotted view of the drive chain and associated parts; Fig. 4 is an enlarged broken side elevational view of the apparatus; Fig. 5 is a broken sectional view taken on the line 5—5 of Fig. 4; Fig. 6 is an enlarged broken sectional view showing filter leaves and piping connected to the cover plate; Fig. 7 shows broken views of the spacing device for the filter leaves; Fig. 8 is an enlarged broken sectional view taken on the line 8—8 of Fig. 6; Fig. 9 is an enlarged broken view of a portion of the filtering apparatus; Fig. 10 is an enlarged broken sectional view taken on the line 10—10 of Fig. 9; Fig. 11 is a view similar to that of Fig. 10 but with parts in changed position; Figs. 12, 13 and 14 are respectively views of the guides, locking pin, and threaded sleeve, which are shown in Figs. 10 and 11; Fig. 15 is an enlarged broken sectional view taken on the line 15—15 of Fig. 9; and Fig. 16 is an enlarged broken sectional view taken on the line 16—16 of Fig. 15.

As shown more clearly in Figs. 6 and 8 of the drawings, the improved filter leaf consists of a bag of suitable fabric 17 which is fitted over a frame made up of the tubular rim 18 which is flattened and provided with a slot 19 to receive and hold the marginal portion of the wire screen 20. Said frame is preferably substantially rectangular in shape in order to make it easy to cut out the wire screen 20 and the bag 17, and also save material. As shown in Fig. 6, the rear part of the frame is preferably rounded at the upper and lower ends, and the front part of the frame has its upper and lower ends connected to the fittings 21 to which latter are connected the upper outlet pipe 22 and the lower outlet pipe 23. The outlet pipes 22 and 23 pass through openings in the cover plate 27 and are provided with openings 24 into the fittings 25 and 26 which are mounted on the outlet pipes 22 and 23 and held in place against the cover plate 27 by the cap nuts 28; suitable packing or gaskets 29' to prevent leakage being interposed between the fittings 25 and 26 and the cover plate 27 and cap nuts 28. The fitting 25 is suitably connected to the upper manifold 29 by the pipe 30 which is provided with the valve 31, and the fitting 26 is suitably connected to the lower manifold 32. A petcock 33 is connected to the fitting 25.

A plurality of filter leaves with connections such as described are mounted on the cover plate 27, and the filter leaves are held in proper spaced relation by means of the bars 34 which have thereon the stationary lugs 35 provided with cavities 36 into which the rear end portions of the filter leaves extend. Near the ends of the bars 34 are provided adjustable spacing lugs adapted to clamp said bars in position. The adjustable spacing lugs consist of the stationary parts 37 and the parts 38 which latter are movable toward or from the parts 37 by turning the screw bar 39 which is connected to the parts 38. The latter have thereon the guide pins 40 which extend through the slots 41 in the bars 34.

The framework of the apparatus consists of the spaced lower channel beams 42 and the spaced pairs of channel beams 43. Two filtering units are preferably mounted on said framework; the stationary cover plates 27 being suitably secured at the ends of the framework to the spaced pairs of upper channel beams 43 and to the spaced lower channel beams 42, and the chambers 45 being movably mounted on the trucks 46 which latter are provided with wheels 47 to run on the channel beams 42. As shown the movable chambers 45 may be reinforced by steel rails 48, the flanges 49 of which are suitably secured to the chambers and cut away at the bends of the rails. The chambers 45 are open only at the front end thereof and are provided with gaskets 50 to prevent leakage of fluid therefrom when they are locked to the stationary cover plates 27.

The means for operating the movable chambers 45 consists of the cylinders 51 which are suitably mounted on the pairs of spaced upper channel beams 43 and have therein the pistons 52 connected to piston rods 53 having thereon the yokes 54 on which are mounted the shafts 55 which have thereon the supporting wheels 56 which are adapted to run on the spaced pairs of upper channel beams 43. A sprocket chain 57 has its ends suitably secured to the anchor bolts 58 on the spaced pairs of upper channel beams 43 and passes around the sprocket wheels 59 on the shafts 55, thence over the sprocket wheels 60 mounted on the brackets 61 secured to the channel beams 43, thence under the sprocket wheels 62 mounted on the lower part of the cover plates 27, and thence over the supporting sprocket wheels 63 which are mounted on the trucks 46. The sprocket chains 57 have thereon the fingers 64 which are adapted to engage the projections 65 on the trucks 46. The fingers 64 are also adapted to engage the ends of the arms 72 attached to the rods 73 which are pivotally mounted on the trucks 46 and are provided with handles 74. By moving the handles 74 the arms 72 can be raised to be out of the path of the fingers 64, so that either chamber 45 can be moved while the other chamber remains in place. An air supply pipe 66 provided with the valve 67 is connected to the fourway valve 68 and the latter is connected to piping 69 leading to the ends of the cylinder 51. The valve 68 may be operated by the rod 70 having thereon the handle 71. When air under pressure is admitted to the cylinders by operating the valve 68, it will be understood that the sprocket chain 57 is operated and the fingers 64 engage the projections 65 or the arms 72 so that one chamber 45 may be moved to or from its stationary cover plate 27, while the other chamber 45 remains locked to its stationary cover plate 27. It will be seen that the construction and arrangement of the pair of filtering units saves space and machinery and permits of one unit being worked while the other is being cleaned out or repaired.

The means for locking the movable chambers 45 to the stationary cover plates 27 consists of the locking pins or T-bolts 75 mounted on the cover plates 27 and provided with heads 76 adapted to pass through slots 77 in the upper and lower parts of the chambers 45. On the T-bolts 75 are fitted the sleeves 78 which have at one end the annular shoulders 79 fitted in grooved collars 80 in which latter are also fitted the annular shoulders 81 provided on extensions of the nuts 82 which are screwed on the T-bolts 75 and held in position by the lock nuts 83. The sleeves 78 are provided with longitudinal slots 84 and they are provided with threads 85 to fit in the interiorly threaded extensions 86 on the worm wheels 87. The extensions 86 are provided with annular shoulders 88 fitted in corresponding recesses provided in the bearing brackets 89 in which the extensions 86 are rotatably fitted and which are suitably secured to the cover plates 27. The bearing brackets 89 have thereon the guides or feather bolts 90 which extend through the slots 84 and the lower ends of which are disposed in the grooves 91 which are provided in the T-bolts 75 and which have straight end portions extending longitudinally of the T-bolts and have helical intermediate portions connecting the straight end portions. Oil cups 92 are provided on the bearing brackets 89. On the cover plates 27 are suitably arranged the thrust bearings 93 for the shafts 94 which latter have thereon the worms 95 in mesh with the worm wheels 87. On the brackets 96 which are suitably secured to the cover plates 27 are mounted the shafts 97 which have fast thereon the operating hand wheels 98 and the bevel wheels 99 which latter are in mesh with bevel pinions 100 fast on the vertical shafts 101 which latter also have fast thereon the bevel pinions 102 in mesh with the bevel wheels 103 fast on the shafts 94. It will be understood that by turning the handwheels 98 the shafts 94 and the worm wheels 87 are rotated and cause the sleeves 78 to move the T-bolts 75 and turn the latter so that the heads 76 can pass through the slots 77. The heads 76 of the T-bolts are moved into or out of engagement with the cover plates 27 while the feather bolts 90 follow the straight portions of the grooves 91, so that turning of said T-bolts is easily effected while the feather bolts 90 follow the helical portions of the grooves 91.

The fluid to be filtered is admitted to the chambers 45 through the inlet pipes 104 which are connected to the cover plates 27. By means of pressure or suction the fluid is filtered through the filter leaves and passes through the pipes 22 to the manifolds 29. The manifolds 29 and 32 are provided with valves 105 and 106 connected by the pipes 107. Pipes 108 are connected to the valves 106 and lead to the filtered fluid reservoir, not shown. Both valves 105 and 106 may be opened so that the filtered fluid passes through the pipes 22 and also through the pipes 23 to the manifolds 29 and 32. By opening the petcocks 33 the filtered fluid can be inspected and the working condition of any of the filter leaves can be determined. The valves 31 can be closed to cut out any of the filter leaves from which the filtered fluid is not running clear or is not of the condition desired. When it is desired to wash the filter leaves and the deposit or cake on the filter leaves, or move the chambers away from the cover plates, the supply of unfiltered fluid through the pipes 104 is shut off, the valves 105 are closed, and the valves 106 are opened to allow the stronger filtered fluid to drain through the pipes 23 and pass to the filtered fluid reservoir. After draining off the stronger filtered fluid, the valves 106 may be closed and wash water admitted to the chambers 45 through the pipes 104 so that the weaker filtered fluid passes through the pipes 23, manifolds 32, pipes 108, and thence may pass through the pipes, not shown, leading from the pipes 108 to a reservoir for weak filtered fluid. In case the apparatus is operated under the pressure system, air under pressure can be admitted to the chambers 45 through the pipes 109 which are provided with valves 110 and are connected to the upper parts of the stationary cover plates 27. When the chambers 45 are moved away from the stationary cover plates 27, the filter leaves mounted on said cover plates are not disturbed and therefore none of the deposit or cake on the filter leaves is jarred or shaken off in the chambers, and the filter leaves are conveniently accessible for cleaning or repairs. By closing the valves 105 and admitting air under pressure to the filter leaves through the pipes 111 which are provided with valves 112 and connected to the manifolds 29, the filter leaves can be inflated to facilitate the removal of the deposit or cake therefrom.

From the foregoing description, the construction, operation, and advantages of the improved filtering apparatus will be readily understood by those skilled in the art, and it will be seen that the construction is well adapted to accomplish the objects of the invention.

The construction which has been particularly illustrated and described admits of minor changes and modifications—wherefore the right is reserved to all such changes and modifications as do not depart from the spirit and scope of the invention which is defined in the appended claims.

I claim:

1. A filter leaf having a frame made up of a tubular rim which is flattened and provided with a slot, and a wire screen the marginal portion of which is fitted in said slot.

2. A filter leaf comprising the combination of a tubular rim which is provided with a slot, a wire screen having its marginal portion fitted in said slot, an outlet pipe connected to one end portion of the rim, and also an outlet pipe connected to the other end portion of the rim.

3. A filter leaf comprising the combination of a substantially rectangular frame made up of a tubular rim which is provided with a slot, a wire screen the marginal portion of which is fitted in said slot, fittings on the upper and lower parts of the frame, and outlet pipes connected to the fittings.

4. The combination of a substantially vertical tubular rim which is provided with a slot, a wire screen the marginal portion of which is fitted in said slot, fittings on the upper and lower parts of the tubular rim, upper and lower outlet pipes connected to said fittings, a manifold, and a connection between the upper outlet pipe and the manifold, said connection including a fitting provided with a petcock, and a pipe provided with a valve.

5. The combination of filter leaves, a bar, stationary lugs disposed on the bar and having cavities into which the filter leaves extend, and adjustable spacing lugs on the bar adapted to clamp the bar in position on the filter leaves.

6. The combination with filter leaves, of a bar provided with slots, stationary lugs disposed on the bar and having cavities into which the filter leaves extend, and spacing lugs consisting of stationary parts disposed on the bar, movable parts provided with guides passing through said slots, and a screw bar connected to the movable parts.

7. The combination of a tubular rim which is provided with a slot, a wire screen having its marginal portion fitted in said slot, an outlet pipe connected to one portion of the rim, a manifold, and a connection between said outlet pipe and said manifold, said connection including a fitting provided with a petcock, and a pipe provided with a valve.

8. Filtering apparatus comprising the combination of a framework, trucks movably mounted thereon and provided with projections, chambers carried by the trucks, arms pivotally mounted on said trucks, stationary cover plates for the chambers disposed at the ends of the framework and having filter leaves mounted thereon, a sprocket chain, means to operate the sprocket chain, and a finger on the sprocket chain adapted to engage the projection or arm on one of said trucks so that one chamber can be moved to or from its cover plate while the other chamber remains locked to its cover plate.

9. Filtering apparatus comprising the combination of a framework, movably mounted trucks, stationary cover plates disposed near the ends of the framework and having filter leaves mounted thereon, and chambers detachably connectible to said cover plates and mounted on said trucks.

10. Filtering apparatus comprising the combination of a framework, trucks movably mounted thereon, stationary cover plates disposed near the ends of the framework and having filter leaves mounted thereon, chambers detachably connectible to said cover plates and mounted on said trucks, and tractive means to move either of said trucks at will so that one chamber can be moved to or from its cover plate while the other chamber remains locked to its cover plate.

In testimony whereof, I have signed my name to this specification at Los Angeles, county of Los Angeles, State of California, this 18th day of August, A. D. 1916.

ARTHUR R. PECK.